United States Patent [19]
Clark

[11] Patent Number: 5,509,852
[45] Date of Patent: Apr. 23, 1996

[54] AUTOMOBILE INTERIOR VENTILATOR WITH VOICE ACTIVATION

[76] Inventor: Darrell Clark, 1041 E El Freda, Tempe, Ariz.

[21] Appl. No.: 250,288

[22] Filed: May 27, 1994

[51] Int. Cl.⁶ .................................................. B60H 1/26
[52] U.S. Cl. ............................. 454/75; 454/141; 454/162
[58] Field of Search ........................... 454/75, 141, 162

[56] References Cited

U.S. PATENT DOCUMENTS

| | | | |
|---|---|---|---|
| 3,943,726 | 3/1976 | Miller | 62/2 |
| 4,497,240 | 2/1985 | Nagatomo | 454/75 |
| 4,852,469 | 8/1989 | Chuang | 454/75 |
| 4,904,044 | 3/1990 | Gudmundsen | 62/236 |
| 4,917,293 | 4/1990 | Fedter | 236/49.3 |
| 5,040,455 | 8/1991 | Doi et al. | 454/75 |
| 5,054,686 | 10/1991 | Chuang | 454/75 X |
| 5,129,192 | 7/1992 | Hannmisn | 49/349 |
| 5,222,661 | 6/1993 | Wenhart | 236/49.3 |
| 5,238,447 | 8/1993 | Weissbrich et al. | 454/75 |
| 5,259,814 | 11/1993 | Weissbrich et al. | 454/75 |

FOREIGN PATENT DOCUMENTS

| | | | |
|---|---|---|---|
| 13216 | 2/1981 | Japan | 454/75 |
| 41204 | 3/1982 | Japan | 454/75 |
| 126712 | 8/1982 | Japan | 454/75 |
| 118518 | 7/1984 | Japan | 454/75 |
| 275821 | 11/1987 | Japan | 454/75 |

*Primary Examiner*—Harold Joyce
*Attorney, Agent, or Firm*—Sandra L. Etherton

[57] ABSTRACT

A system for ventilating the cabin of an overheated vehicle which takes advantage of convection and evaporation as methods of cooling. The system is voice controlled. The invention places a fan, separate from the vehicle's air conditioning and heating system, near the rear of the cabin. The fan directly connects the interior cabin air to outside air. Upon the opening of the driver's door, the driver's window rolls down and the fan turns on, drawing hot air out of the cabin to the outside, through the rear duct and across the driver's perspiring face and body. After the temperature inside the cabin drops to a predetermined comfortable temperature, a chime sounds to alert the driver to turn the ventilating system off. Alternatively, the system may shut off automatically after a preset time period. Voice control allows the driver to winterize the system, to turn off the chime, or to run the system for demonstration purposes.

9 Claims, 4 Drawing Sheets

AUTOMOBILE INTERIOR VENTILATOR WITH VOICE ACTIVATION

BACKGROUND OF THE INVENTION

This invention relates generally to ventilation of the interior of an automobile cabin. More specifically, this invention relates to a system with voice-controls for ventilating an overheated automobile cabin by using convection to convey hot air out of the cabin, and by using evaporation to cool the driver's perspiring face and body.

When vehicles are parked in the sun, heat can build up quickly in the cabin. The seats, dash and other interior features begin to absorb the sun's energy and radiate it into the cabin. With the windows and doors closed, air does not circulate to remove the heat. In the desert southwest and other hot climates, the interior temperature of a closed vehicle can reach a scorching 140 degrees or more in a matter of minutes.

When a driver returns to his vehicle after it has been sitting in the sun, getting into the vehicle can be quite uncomfortable, as the pent-up, searing heat envelopes the driver. Because of the large volume of space inside a vehicle, cooling the interior takes many minutes as the volume of hot air must be displaced with cooler air. To speed the cooling of the interior, the driver typically turns on the air conditioner as soon as the vehicle is started. The air conditioner then works at full capacity to chill the overheated cabin air, causing a severe load on the air conditioning unit and the vehicle engine.

To ventilate the cabin of a vehicle after it has been sitting in the sun, the prior art describes several systems to blow the hot air out of the cabin. In U.S. Pat. No. 5,238,447, Weissbrich et al. (Weissbrich '447) describe a system to allow hot air to rise and escape through a car's sunroof. When the interior temperature of the car is hotter than a predetermined threshold, if the door is unlocked or the ignition key is inserted in the ignition, the sun roof opens automatically. Simultaneously, a ventilator may be turned on to help push hot cabin air out of the roof opening. The system is powered the vehicle's battery or a solar battery.

In U.S. Pat. No. 5,259,814, Weissbrich et al. (Weissbrich '814) describe a system in which the temperatures inside and outside the cabin are measured and compared to thresholds. If the inside temperature is greater than the outside temperature and greater than the threshold temperature, the windows automatically open to allow hot air to drift out. If the inside temperature is greater than the outside temperature but less than the threshold temperature, the windows automatically close to keep warmer air in. When the interior temperature is less than the outside temperature and less than a threshold temperature, the windows close and a fan conveys relatively warmer air from the outside into the cabin. The fan is preferably placed near the vehicle window. The system may run when the motor is off or on.

U.S. Pat. No. 5,222,661 issued to Wenhart describes a system for automatically cooling the interior of a vehicle by opening a window and using the fan of the vehicle's own ventilation system to blow hot cabin air out of the cabin's windows when the interior temperature exceeds a given threshold.

As these examples show, the prior art is based on the idea of blowing all the hot air out of the cabin, typically through the window or roof vents that have been automatically opened. U.S. Pat. No. 4,497,240 issued to Nagatomo describes a variation on these systems in which vehicle's existing air flow system is employed while the car is parked and unoccupied. The system uses the fan native to the car to circulate cabin air within the vehicle or to introduce external air through the duct that connects the cabin to the outside, via a damper. The windows are not opened to vent the cabin. A power source separate from the vehicle's power source supplies power to the built-in cooling system when the car is not on. The temperature inside the cabin is measured and when it exceeds a predetermined temperature, the vehicle's fan is turned on to blow outside air into the overheated cabin or, conversely, to exhaust hot cabin air.

While the prior art may be effective in removing hot air from the cabin, it does not take advantage of another method of cooling: evaporation. If the cabin of the car becomes too overheated for the driver to be comfortably seated, typically the driver will perspire as the cabin is opened. If air is then drawn across the driver's sweaty skin, evaporation will remove the heat from the skin and the driver will feel cooler. In the prior art, instead of drawing the relatively cooler outside air across the driver's face and body, the relatively hotter air from inside the cabin envelopes the driver as the air makes its way to the window or roof near the driver's head. This air flow has the undesirable effect of extending the time the hot cabin air is in contact with the driver.

Therefore, it is an object of this invention to improve the prior art of automobile cabin ventilation by providing a system which takes advantage of evaporation of driver's perspiration. Another object of this invention is to provide a vehicle ventilation system in which the cooling effect is felt immediately by the driver. Another object of this invention is to provide a ventilation system which begins operation at the driver's command, particularly when the driver returns to his vehicle that has been sitting in the scorching heat. A further object of this invention is to provide voice-activated controls for various system parameters. Another object of this invention is to provide a simple., low-cost ventilation system which can easily be installed in a vehicle during production or as an after-market purchase.

BRIEF SUMMARY OF THE INVENTION

This invention describes a system for ventilating the cabin of an overheated vehicle which takes advantage of convection and evaporation as methods of cooling. The system is voice controlled. The invention places a fan, separate from the vehicle's air conditioning and heating system, near the rear of the cabin. The fan directly connects the interior cabin air to outside air. The ventilation system starts when the driver unlocks or opens the driver's door and suitable conditions are met. The driver's window rolls down and then the fan turns on, drawing hot air out of the cabin to the outside, through the rear of the cabin and across the driver's perspiring face and body. After the temperature inside the cabin drops to a predetermined comfortable temperature, a chime sounds to alert the driver to turn the ventilating system off. Alternatively, the system may shut off automatically after a preset time period. Voice control allows the driver to winterize the system, to turn off the chime, or to run the system for demonstration purposes.

DESCRIPTION OF THE PREFERRED EMBODIMENTS

Figure 1:
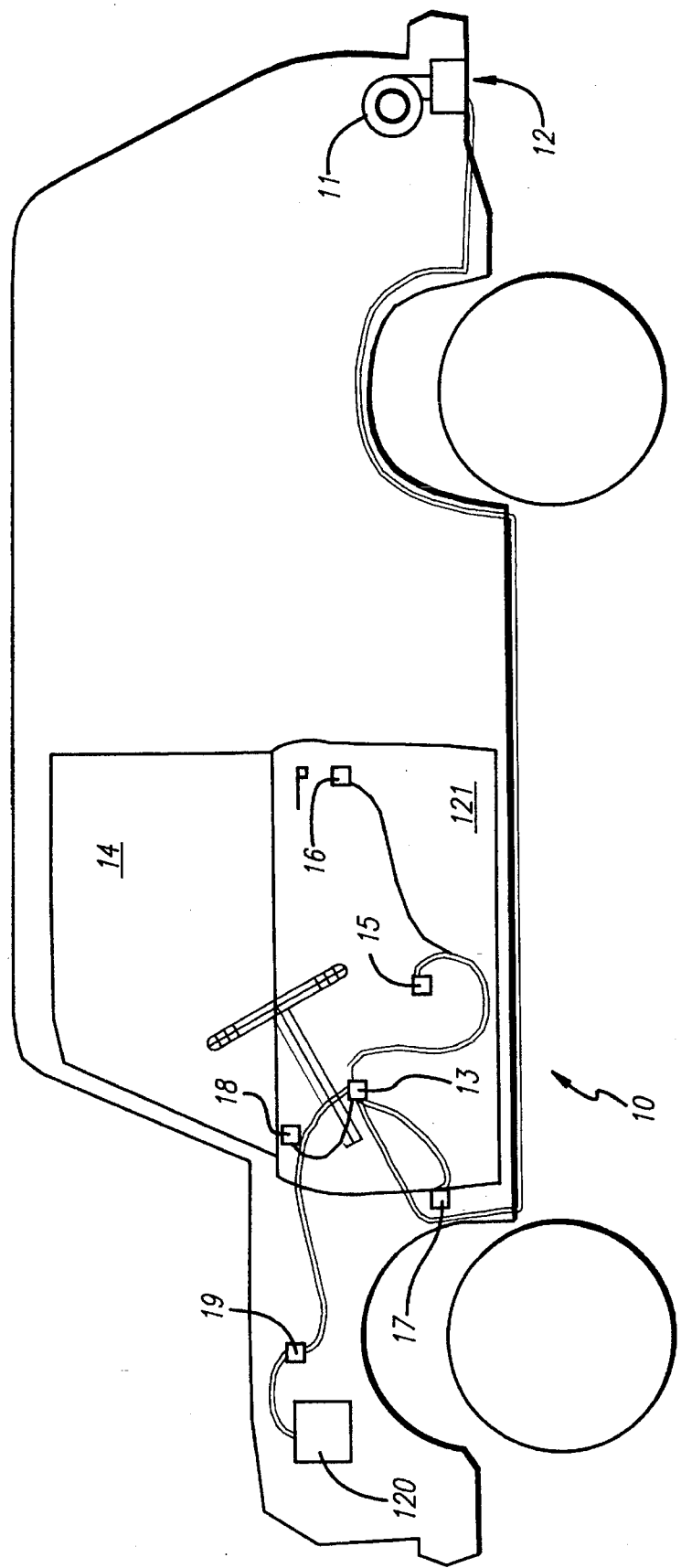
FIG. 1 is a cross-section schematic illustrating the present invention installed in the bed of a sport utility, van, or other like vehicle.

FIG. 1 illustrates a preferred embodiment of this invention where the system for ventilating the cabin of a sport utility, van, or other like vehicle is denoted generally as 10. A blower 11 is installed near the rear of the vehicle, preferably in a hole cut in the bed 12 of the vehicle so that air from the cabin is exhausted to the outside under the vehicle. When a driver approaches the vehicle and opens or unlocks the driver's door, an electronic control module 13 accepts inputs to determine whether the system 10 should turn on. When appropriate inputs are received by the control module 13 and conditions are thus suitable for starting the system, the driver's window 14 rolls down and the blower 11 turns on. The blower causes the hot air in the cabin to be pulled out of the interior to the exterior of the car. As the hot air in the car is drawn out of the rear of the car, a pressure differential is created, causing relatively cooler air to be pulled in through the driver's window. In this manner, the cooler air passes across a driver's face and body, causing evaporation of perspiration. Thus, the cabin of the vehicle is cooled through convection and removal of hot air and the driver is cooled through evaporation.

The control module 13 is preferably connected to the power window control 15, the power door lock solenoid 16, a door open switch 17, a low voltage detector, and two temperature sensors. The low voltage detector and two timers are located on the control module 13. A fuse 19 connects the vehicle battery 120 to the control module 13. Upon opening the driver's door, suitable conditions for operation are determined when a signal is sent to the control module 13 to start a check sequence. This signal is preferably the driver's door 121 being unlocked or the dome light turning on, although other indicators may be used. If suitable conditions are met, the control module tells the power window control to roll down the driver's window and the blower starts. The conditions for operation include an acceptable battery voltage, an unlocked power door lock, cabin temperature above a given threshold, the system has not been used within the last ten minutes, the vehicle ignition is off, and the system is not in winterize mode.

During the check sequence, the control module compares the interior cabin temperature provided by temperature sensor 18 to a reference temperature provided by the temperature sensor under the dash. If the interior temperature is higher than the reference temperature, the ventilation sequence continues. The temperature sensing means are preferably thermistors, although thermocouples or other devices may be employed. One temperature sensor (not shown) used as a reference is located on an electronics board under the dash, and a second temperature sensor 18 is located in the air conditioning duct.

Additional initial parameters are checked by electronic inputs to the control module. The vehicle ignition must be off and the vehicle battery voltage must be adequate to run the ventilating system. In order to avoid draining the vehicle's battery, the control module is equipped with a timer to allow the system to be run only after a time-out period has expired. Preferably, the time-out period is ten minutes. The system will initiate only if a ten minute time period has expired since the system was last in use. This time-out period is checked during the check sequence.

In addition to these conditions, the control module may accept other inputs to customize the initiation of ventilation system. Those skilled in the art will recognize other embodiments for switches to trigger the start of the ventilation system such as freon temperature sensors, pressure sensitive switches in the driver's seat, or anti-theft signals. Alternatively, the ventilation system may be triggered by remote control. For example, the control module could include a receiver to receive the remote signal transmitted to unlock a power door. Then, upon unlocking the door with the remote control and subsequently meeting conditions suitable for starting the system, the window would roll down and the blower would start.

The window is rolled down by the power window motor a sufficient distance to provide a suitable air flow. The distance the window is rolled down is determined by how long the window motor is on, and is set at the time of installation of the ventilation system. The smaller the air flow, the higher the velocity and increased rate of evaporation, but the less air flows through. The distance can be adjusted to suit the driver's concerns. For example, a fully open window will have slow air speed and does not cool the body as quickly, but more air flows through the cabin. Another factor to consider is that the driver may feel safer from crime if the window is only rolled down a short distance.

The size and power of the blower, the distance the window is rolled down, and the volume of the cabin will determine the rate of air flow across the driver's face and out of the cabin. The blower or fan may be one of several known in the prior art. Those suitable include fans found in vacuum cleaners, leaf blowers and hair dryers. Preferably, a centrifugal blower with a wheel diameter of about 5.75" should be used in a sport utility vehicle or like vehicle with a large cabin volume. A damper is installed in the blower to prevent exhaust fumes from backflowing into the cabin through the fan. The damper may also serve to prevent water, noise, dirt or other substances from entering the cabin. The blower operates before and after then engine has been started.

A chime may sound after the vehicle has been started to indicate to the driver that the vehicle's air conditioning switches should be set to positions which best cooperate with the ventilation system. Preferably, the switches are initially set to a low fan speed and to allow fresh air to enter the cabin. Decals may be applied to the air conditioning switches to indicate these positions. After the cabin is cooled, a double chime or second chime will sound to tell the driver that the windows should be rolled up and the vehicle's air conditioning switches should be set to second positions. Preferably, the switches are then set to a high fan speed and to recirculate cabin air. The chimes may be disabled with a proper response to a voice chip query.

Figure 2:
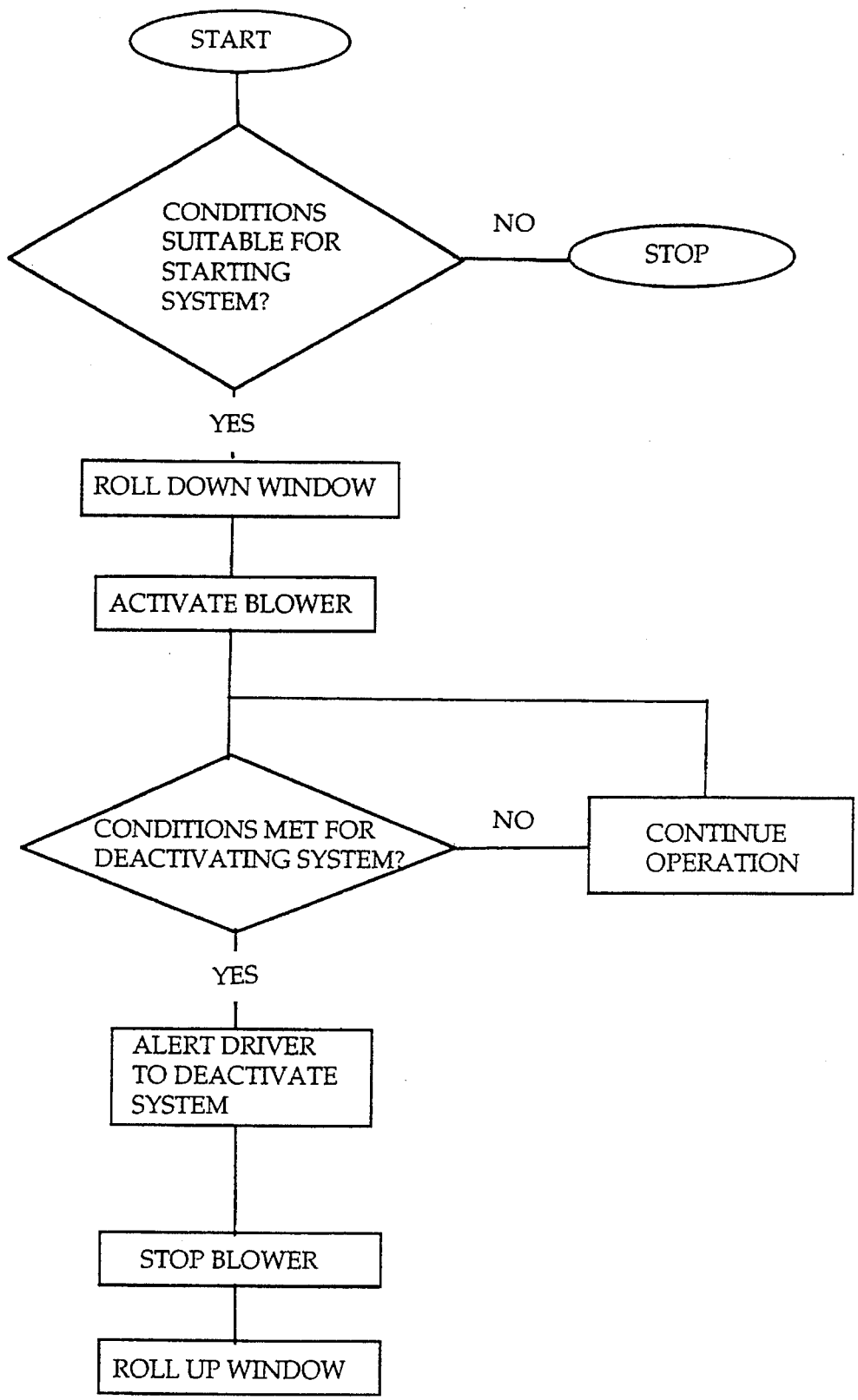
FIG. 2 is a flow chart of the present system.

The ventilation system will stop operating when any one of the following conditions is met: a preset amount of time has elapsed since the blower has turned on, the temperature in the air conditioning duct has dropped below a preset temperature, or the power door lock is unlocked again. Preferably, after three minutes, a timer sends a signal to the control module 13 which, in turn, turns the system off. Alternatively, the system may sound a chime to alert the driver to manually turn off the system via a switch, also connected to the control module. FIG. 2 summarizes the flow of the present invention's process for ventilating the cabin. During cooler seasons, it may be desirable to deactivate the system completely so that the system will not be falsely triggered by the heater. This winterize mode is enabled with a proper response to a voice chip query.

The voice control used in this invention is made possible by the use of a low-cost integrated circuit (voice chip). Voice recordings of menu items are recorded on the voice chip and are played back upon command. The voice-activation circuit is connected to the power door lock solenoid 16 and operates when the vehicle is not on, the driver's door is open, and the ventilating system is not operating. Each time the unlock button is pressed, the voice chip detects the voltage change, receiving each press as a trigger signal. Upon receipt of an appropriate response, the voice chip sends a signal to the control module to activate the corresponding action.

Upon the suitable start-up conditions, the voice chip plays an introductory message in which menu option numbers are given, the numbers corresponding to the number of times the unlock button should be pressed in response. To respond to the query, the same unlock button is pressed the number of times corresponding to the option desired. For example, to select option two, the unlock button is pressed twice. Menu selections for the present invention include options to turn off the chime sounds, to winterize the system, and to run the ventilation system for demonstration purposes.

Alternatively, the voice chip may be installed upon another existing circuit so that the response button may be any other pre-existing switch which is not being used at the time. Switches which are in an unoperative state, such as when the car is off, may be used. In this manner, no additional switches need to be installed in the car, thus reducing the cost, and the car's factory appearance is maintained.

Figure 3:
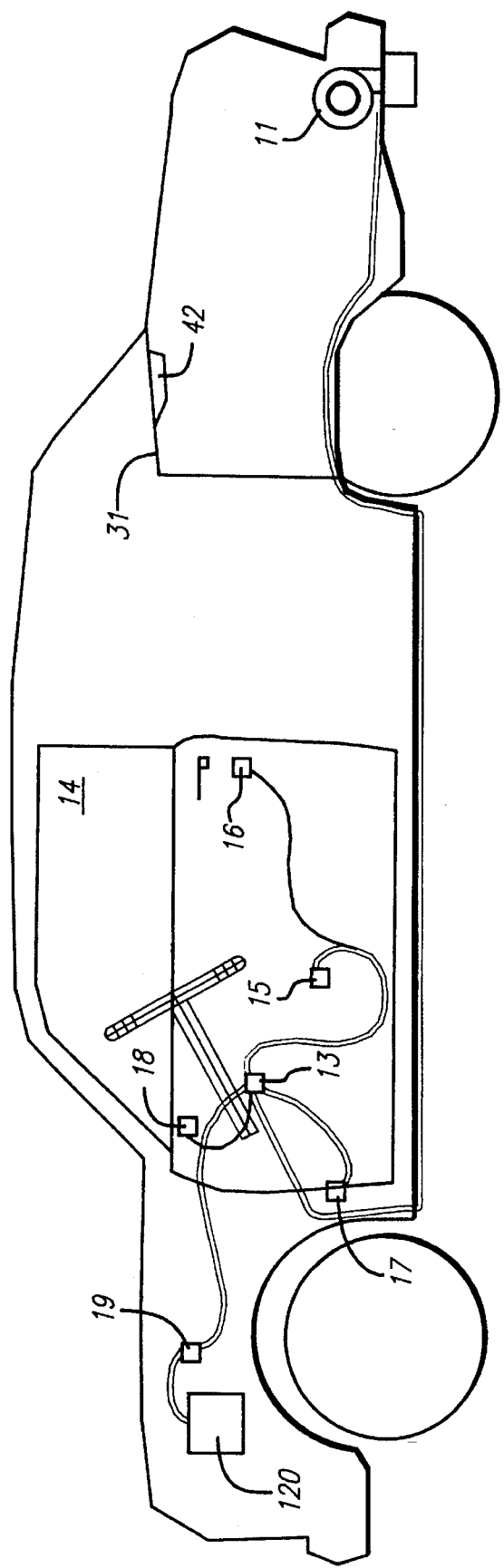
FIG. 3 is a cross-section schematic illustrating an alternate embodiment of the present invention for ventilating the cabin of a sedan- or coupe-type vehicle having a rear deck and utilizing an optional duct.

FIG. 3 illustrates an alternate embodiment of the present invention. The system for ventilating the cabin is installed in a sedan- or coupe-type vehicle having a rear deck 31. As in the preferred embodiment, the control module 13 is preferably connected to the power window 15, the power door lock solenoid 16, a low voltage detector, and two temperature sensors. A fuse 19 interconnects the vehicle battery 120 to the control module 13 and the blower 11. The system's operation follows that of the preferred embodiment and will not be repeated here.

The blower is in communication with the outside and causes the hot air in the cabin to be pulled out of the interior to the exterior of the car. As in the first embodiment, the hot air in the car is drawn out of the rear of the car and a pressure differential is created causing relatively cooler air to be pulled in through the driver's window 14. In this manner, the cooler air passes across a driver's face and body, causing evaporation of perspiration. Thus, the cabin of the vehicle is cooled through convection and removal of hot air and the driver is cooled through evaporation.

Figure 4:
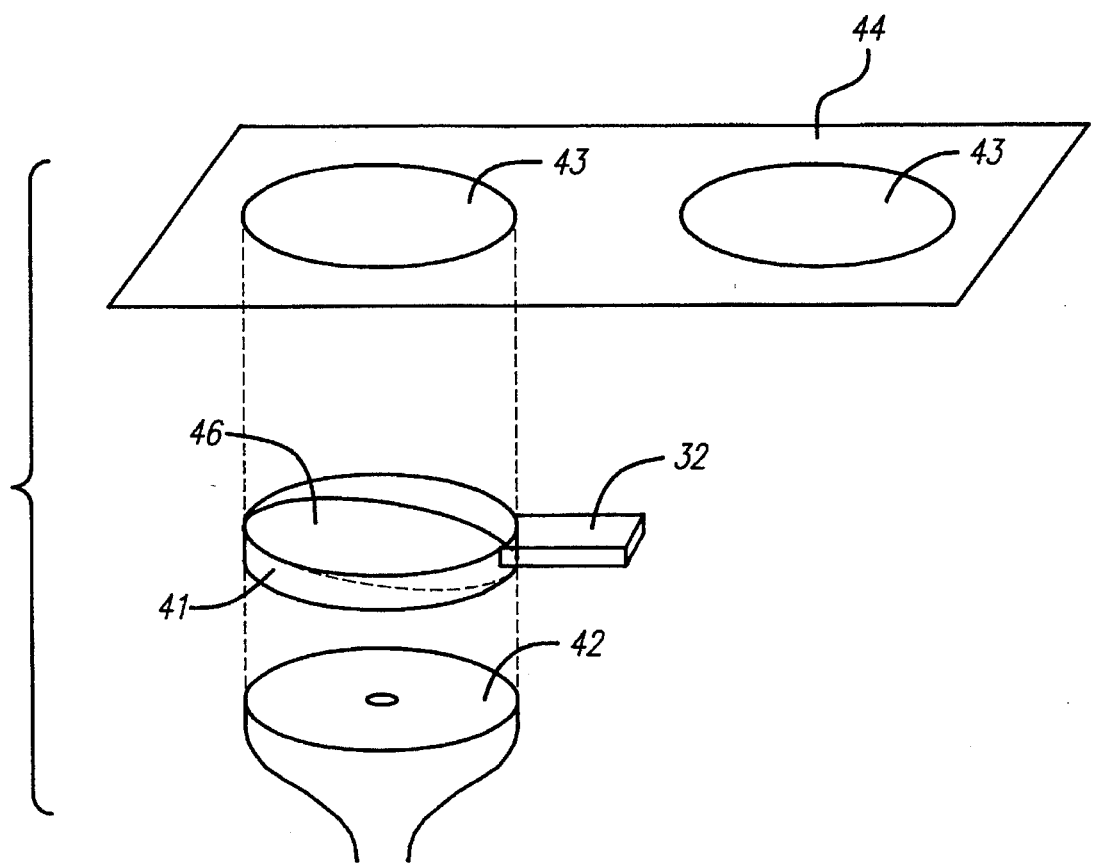
FIG. 4 illustrates an exploded view of an embodiment of the present device installed in the rear deck of a car.

For convenience, the present invention may be more easily installed in a sedan- or coupe-type vehicle by taking advantage of the holes that have already been cut for rear speakers 42. FIG. 4 illustrates the present device installed in the rear deck of a car, wherein the cabin air is pulled to the outside of the vehicle through holes which were initially cut for rear speakers. Optionally, a duct 32 which connects to the blower (not shown) may be attached to a manifold 41. The manifold 41 is installed between a speaker cone 42 and the rear deck 44, into speaker holes 43 which had been cut to accommodate the speakers 42. A light mesh 46 may be suspended at an angle within the manifold to protect the speakers.

The objectives of the present invention are achieved from the various embodiments described herein. However, it will be apparent to those skilled in the art that various modifications to the preferred embodiments of the invention can be made without departing from the spirit or scope of the specification and claims that follow.

I claim:

1. A process for ventilating the interior of an automobile comprising:

rolling down a window on a driver's side of a vehicle upon the receipt of an indication of the opening of a door on the driver's side of the vehicle;

activating a means for conveying air from the inside of a vehicle cabin to the outside, wherein the means for conveying air is located near the rear of the vehicle, such that outside air replaces the air conveyed from the inside of a vehicle cabin to the outside, and the outside air passes through a location where a driver sits to effect evaporation.

2. The process according to claim 1 further comprising the step of deactivating the means for conveying air after a preset period of time.

3. The process according to claim 1 further comprising the steps of:

alerting the driver to deactivate the means for conveying air; and deactivating the means for conveying air at the driver's command.

4. A process according to claim 1 further comprising a damper attached to the means for conveying air to prevent outside substances from backflowing into the vehicle.

5. A process for ventilating the interior of a vehicle comprising:

measuring a voltage of a vehicle battery;

determining a reference temperature value;

determining an inside temperature value;

comparing the reference temperature value to the inside temperature value, and if the inside temperature value is greater than the reference temperature value and there is sufficient battery power to operate the ventilation system;

rolling down a window on a driver's side of a vehicle;

activating a means for conveying air from the inside of a vehicle cabin to the outside, the means for conveying air from the inside of a vehicle cabin to the outside being located near the rear of a vehicle, such that outside air replaces the air conveyed from the inside of a vehicle cabin to the outside, and the outside air passes through a location where a driver sits, in order to effect evaporation, wherein the means for conveying air from the inside of a vehicle cabin to the outside is activated upon the opening of a vehicle door.

6. The process according to claim 5 wherein the means for conveying air from the inside of a vehicle cabin to the outside is activated upon the receipt of an indication of the opening of a door on the driver's side of the vehicle.

7. The process according to claim 5 further comprising the step of:

deactivating the means for conveying air when the inside temperature value is less than or equal to the reference temperature value.

8. The process according to claim 5 further comprising the step of:

alerting a driver by sounding an alarm when the inside temperature value is less than or equal to the reference temperature value.

9. The process according to claim 5 wherein deactivating the means for conveying air occurs after a preset time.

* * * * *